Sept. 1, 1964 R. G. RUTMAN ETAL 3,146,847
TORSION BAR COUNTERBALANCE FOR TILTING CAB VEHICLES
Filed Feb. 2, 1962 2 Sheets-Sheet 1
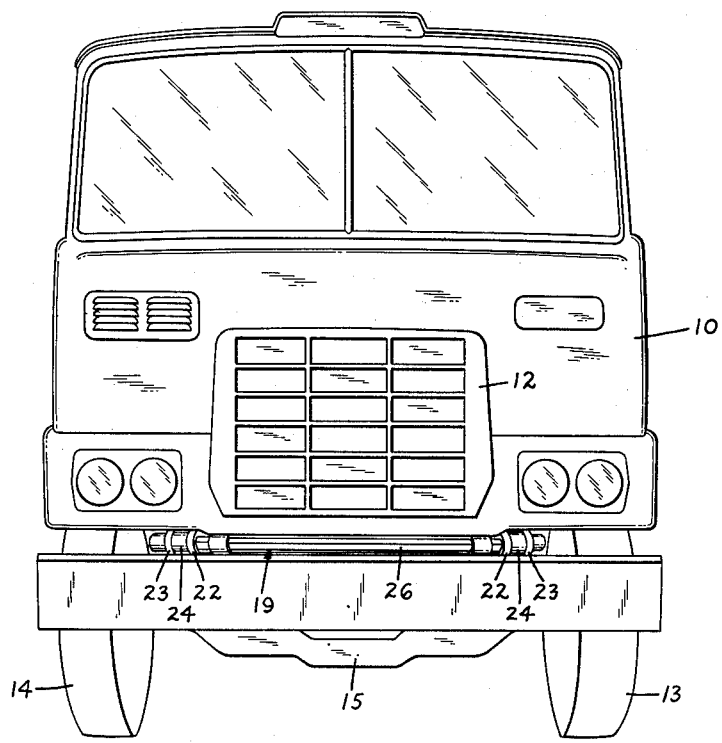
FIG.I.
INVENTORS:
RALPH G. RUTMAN
DONALD M. LOGAN
BY
THEIR ATTORNEYS Sept. 1, 1964    R. G. RUTMAN ETAL    3,146,847
TORSION BAR COUNTERBALANCE FOR TILTING CAB VEHICLES
Filed Feb. 2, 1962    2 Sheets-Sheet 2
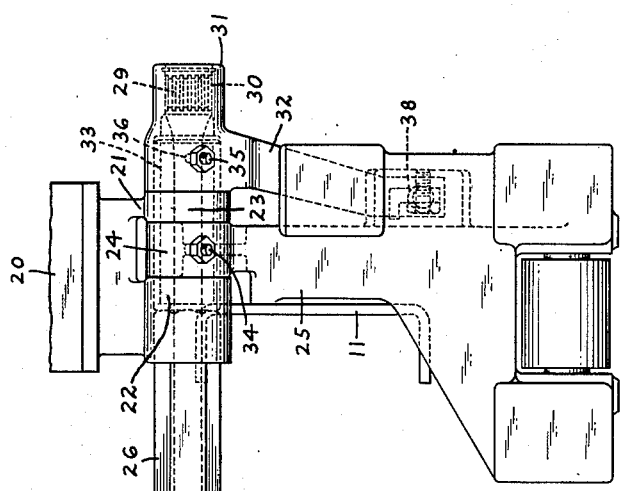
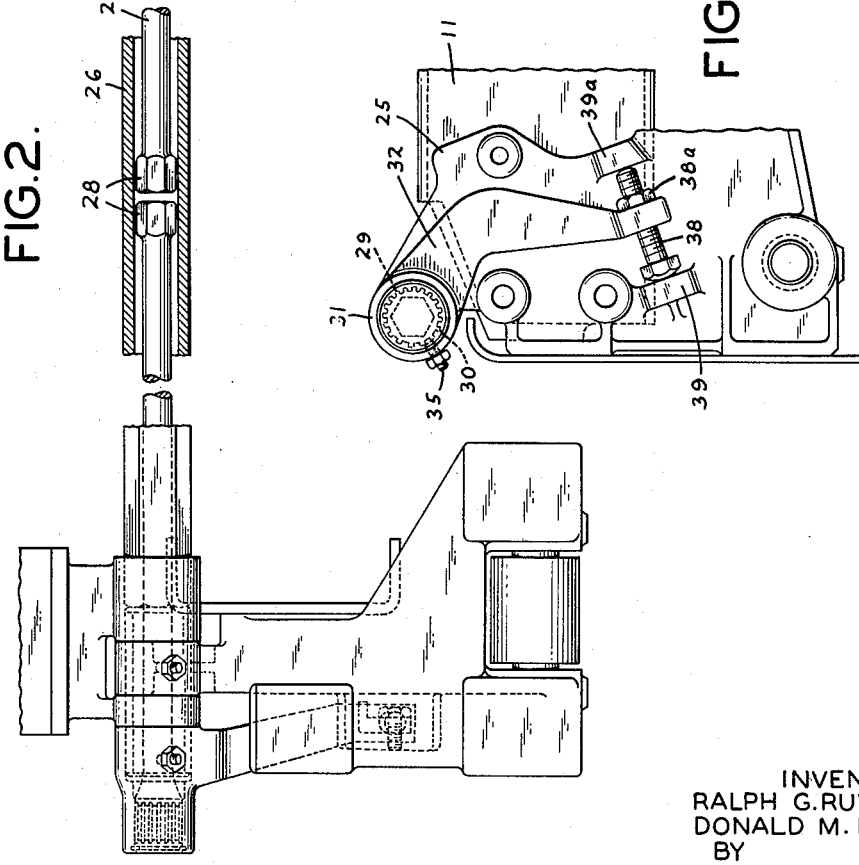
INVENTORS:
RALPH G. RUTMAN
DONALD M. LOGAN
BY
THEIR ATTORNEYS 3,146,847
TORSION BAR COUNTERBALANCE FOR
TILTING CAB VEHICLES
Ralph G. Rutman, Allentown, and Donald M. Logan, Emmaus, Pa., assignors to Mack Trucks, Inc., Plainfield, N.J., a corporation of New York
Filed Feb. 2, 1962, Ser. No. 170,571
1 Claim. (Cl. 180—89)

This invention relates to improvements in motor vehicles of the cab-over-engine or tilting cab type and it relates particularly to improvements in cab structures, including counterbalances for such vehicles.

In the development of trucks and tractors for hauling trailers, the design and structure of the cab and its relation to the engine and the vehicle frame are dictated and controlled largely by state regulations limiting the overall length of the tractor and trailer combination. In order to keep the length of the vehicles within state regulations and yet have maximum carrying capacity in the trailer, the front to rear and side to side dimensions of the vehicle cab are strictly limited. One way of keeping the cab dimensions relatively small is to mount the cab for tilting movement above the engine of the vehicle.

The present invention relates to improvements in such tilting cab trucks or tractors and especially to a new type of counterbalance for facilitating the tilting movement of the cab.

More particularly in accordance with the present invention, the cab of the vehicle is pivotally mounted on the forward end of the frame by means of a combined support and counterbalance of the torsion bar type which enables the torque or torsion of the counterbalance to be adjusted within close limits thereby assisting the tilting movement of the cab to uncover and cover the engine.

For a better understanding of the present invention, reference may be had to the accompanying drawings, in which, FIGURE 1 is a front elevational view of a typical tilting cab vehicle embodying the present invention;

FIGURE 2 is a front elevational view of a portion of a torsion bar counterbalance and cab support for the vehicle; and FIGURE 3 is a side elevational view of the counterbalance and a portion of the frame and cab to which the counterbalance is attached.

The vehicle chosen for purposes of illustration includes a cab 10 which is hingedly or pivotally mounted at the forward end of a vehicle frame which may be made up suitably of a pair of parallel or substantially parallel and interconnected channel members 11 shown partially in FIGS. 2 and 3 which carry the engine (not shown), for driving the vehicle, the engine being disposed at the forward portion of the vehicle behind the grille 12 in the front of the cab.

The frame is supported on the usual front and rear wheels, only the front wheels 13 and 14 and the supporting front axle 15 being shown in the drawings.

Except as pointed out hereinafter, the frame, engine and cab may be of any of the conventional and well-known types.

In accordance with the invention, a novel type of pivot and counterbalance 19 is provided for mounting the cab 10 on the frame 11 and at least partially balancing its weight to facilitate movement of the cab in a forward tilting direction to uncover the engine and give access to it and a rearward tilting movement to cover the engine and place the cab in position for operating the vehicle. As shown in FIGS. 1, 2, and 3, adjacent opposite ends of the grille and fixedly secured to each of a pair of parallel spaced cab front supports 20 is a downwardly extending hinge member 21 having spaced apart tubular bearings 22 and 23 thereon. An upwardly extending tubular bearing 24 on a bracket 25 is interposed between bearings 22 and 23. The bracket 25 is secured to the forward end of the frame member 11. A similar structure is secured to the front end of the other longitudinally extending frame member (not shown). A tubular resilient torsion member 26 is fixedly secured, as for example, by means of a non-circular socket member to the bearing member 22 on each side of the vehicle and can be twisted in response to a torque applied at its middle. As shown in FIG. 1, the torsion tube member 26 is of non-circular cross-section, for example, hexagonal or octagonal both internally and externally.

A torsion rod or bar 27 extends through each set of bearing members 22, 23 and 24 and has an enlarged inner end 28 conforming to and fitting non-rotatably in about the middle of the torsion member 26. The torsion rods 27 are of equal length and project outwardly beyond the outermost bearing portion 23 on the upper hinge member. In order to fix the ends of the torsion rods 27 on each side of the vehicle against rotation and also to adjust the torque or torsion thereof, the outer end of the rod is provided with an enlarged head 29 having splines 30 thereon which engage in and are locked to a splined hub 31 fixed to and forming a part of one end of lever 32.

A sleeve 33 of larger internal diameter than the enlarged head 29 passes through the bearing portions 22, 23 and 24 and serves as a hinge pin connecting them. A hollow extension on the hub 31 receives telescopically a protruding end on the sleeve 33. Screws 34 and 35 secure the hinge sleeve 33 to the lever 32 and to the bearing 24 respectively. Screw 35 engages in a groove 36 in the sleeve 33 to provide clearance for adjustments as well as prevent relative endwise movement between 32 and 33.

At the lower end of the lever 32 is a bolt or screw 38 which is threaded through the end of the lever and carries a jam nut 38a for locking the screw 38 in an adjusted position. The head of the screw and its opposite end are disposed between a pair of lugs or abutments 39 and 39a on the bracket 25 so that endwise adjustment of the screw through the end of the arm of the lever 32 causes angular adjustment of the lever 32 and twisting or untwisting of the torsion bar 27.

The torsion bar at the opposite end of the counterbalance also has a similar adjusting lever and screw adjustment so that the torque reaction of the rods 27 can be equalized. Moreover, the tubular torsion member 26 enters into the counterbalancing action of the device so that it together with the bars 27 provides the effect of a torsion rod approximately as long as the sum of the lengths of the individual torsion components thereof. By appropriate adjustment of the torsion member and bars, the counterbalance can be preloaded to raise the cab only partially or fully to a position in which its center of gravity is directly above the counterbalance.

It will be understood that the design, the appearance, and the arrangement of the elements of the cab, the construction of the truck frame and the type of engine used are susceptible to considerable variation. Therefore, the form of the invention disclosed herein should be considered as illustrative.

We claim:

In a vehicle having a frame, an engine mounted adjacent to the front of said frame, and a driver's cab disposed over said engine; a counterbalance and support adjacent to said front end of said frame for connecting said cab to said frame for tilting movement relative thereto, comprising a first pair of hinge elements fixed in spaced-apart relation to said cab, a second pair of hinge elements fixed in spaced relation to said frame, tubular hinge pin members for connecting adjacent hinge elements to each other for hinging movement, means for retaining said tubular hinge pin members against axial movement relative to said hinge elements, a tubular torsion member having an axial passage with a non-circular portion at about its middle, means fixedly connecting the opposite ends of said torsion member to said first pair of hinge elements, torsion bars extending through opposite ends of said torsion member and said hinge elements, a non-circular portion on each of said bars fitting non-rotatably in said non-circular portion of said passage, levers detachably connected to the outer ends of said torsion rods, means detachably connecting said levers to the adjacent tubular hinge pin members, and means connected to said levers and to said second pair of hinge elements for turning said outer ends of said torsion bars to adjust the torsion thereof.

References Cited in the file of this patent

UNITED STATES PATENTS

| | | |
|---|---|---|
| 2,091,059 | Thaarda | Aug. 24, 1937 |
| 2,173,893 | Wermich | Sept. 26, 1939 |
| 2,253,671 | Whitney | Aug. 26, 1941 |
| 2,761,370 | Rhodes | Sept. 4, 1956 |
| 2,781,102 | Prichard | Feb. 12, 1957 |
| 2,864,121 | Imber et al. | Dec. 16, 1958 |
| 2,876,857 | Beyerstedt | Mar. 10, 1959 |
| 2,951,548 | Crockett et al. | Sept. 6, 1960 |
| 2,957,696 | Jewell | Mar. 21, 1961 |
| 3,039,557 | Boyce et al. | June 19, 1962 |